INVENTORS
JAMES BRUCE ORKNEY,
JOSEPH T. MIJICH, DONALD W. TYLER,
& ELEANTE F. WOOD, ADMINISTRATRIX
OF ESTATE OF BYRON A. WOOD, D'C'D.

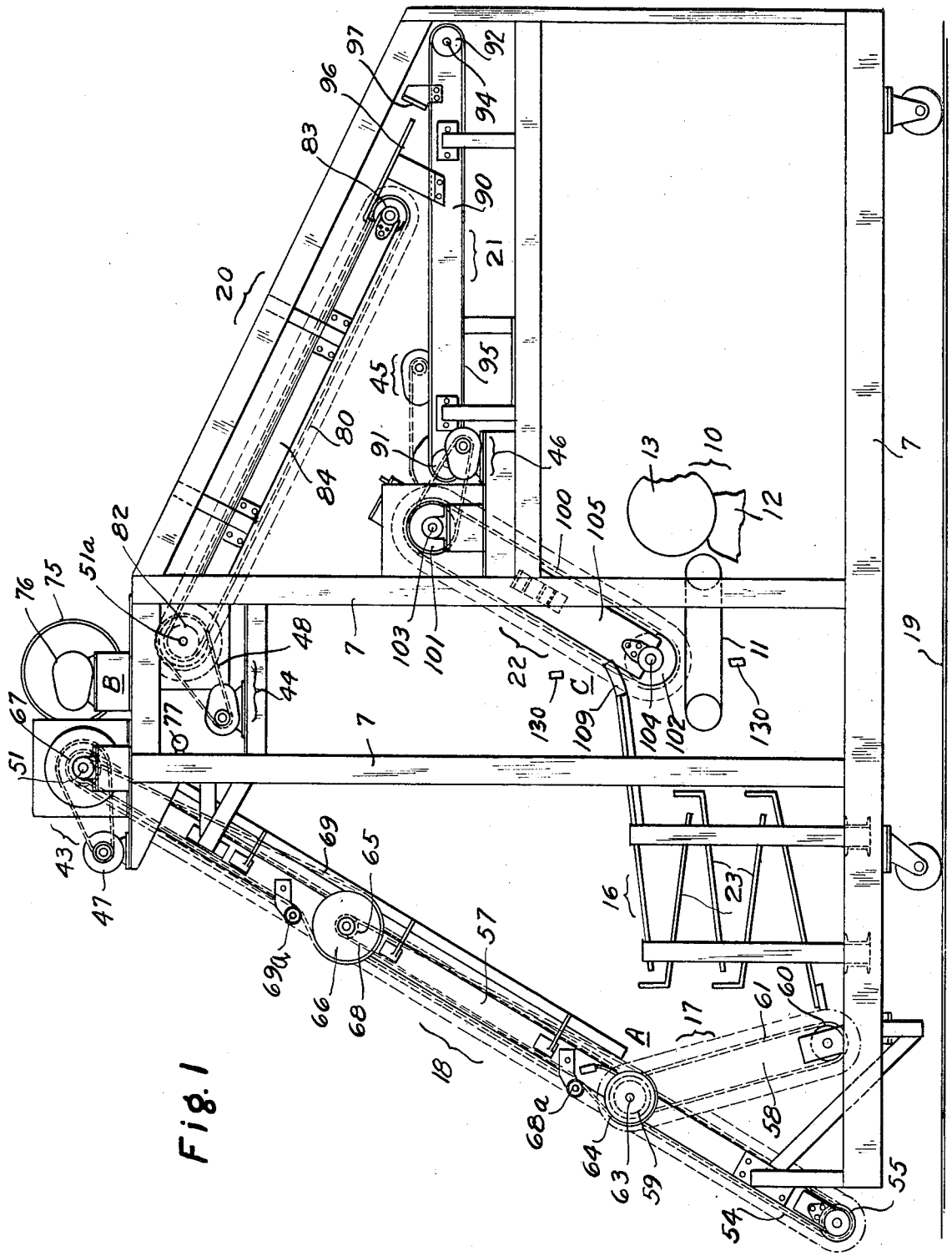

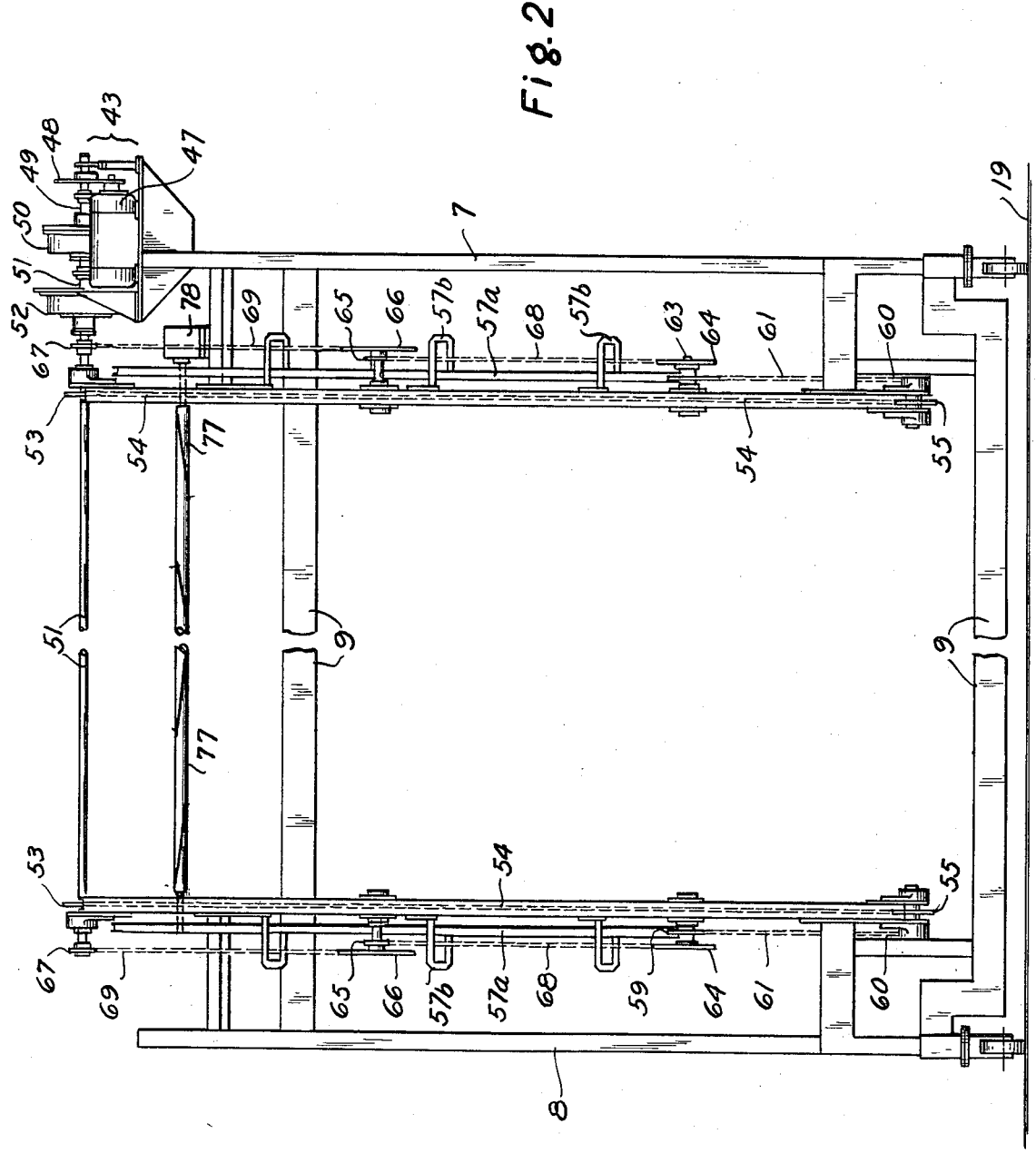

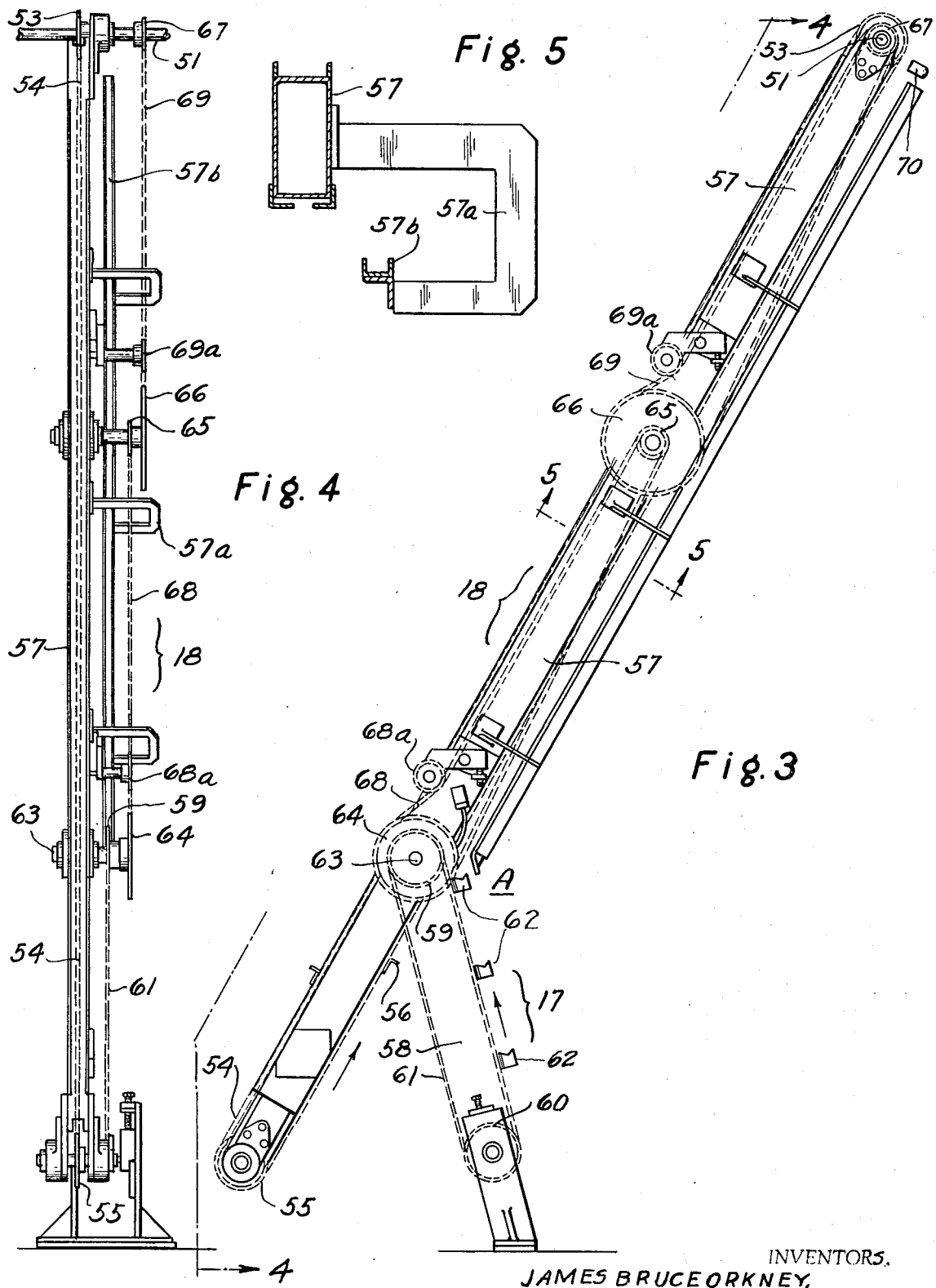

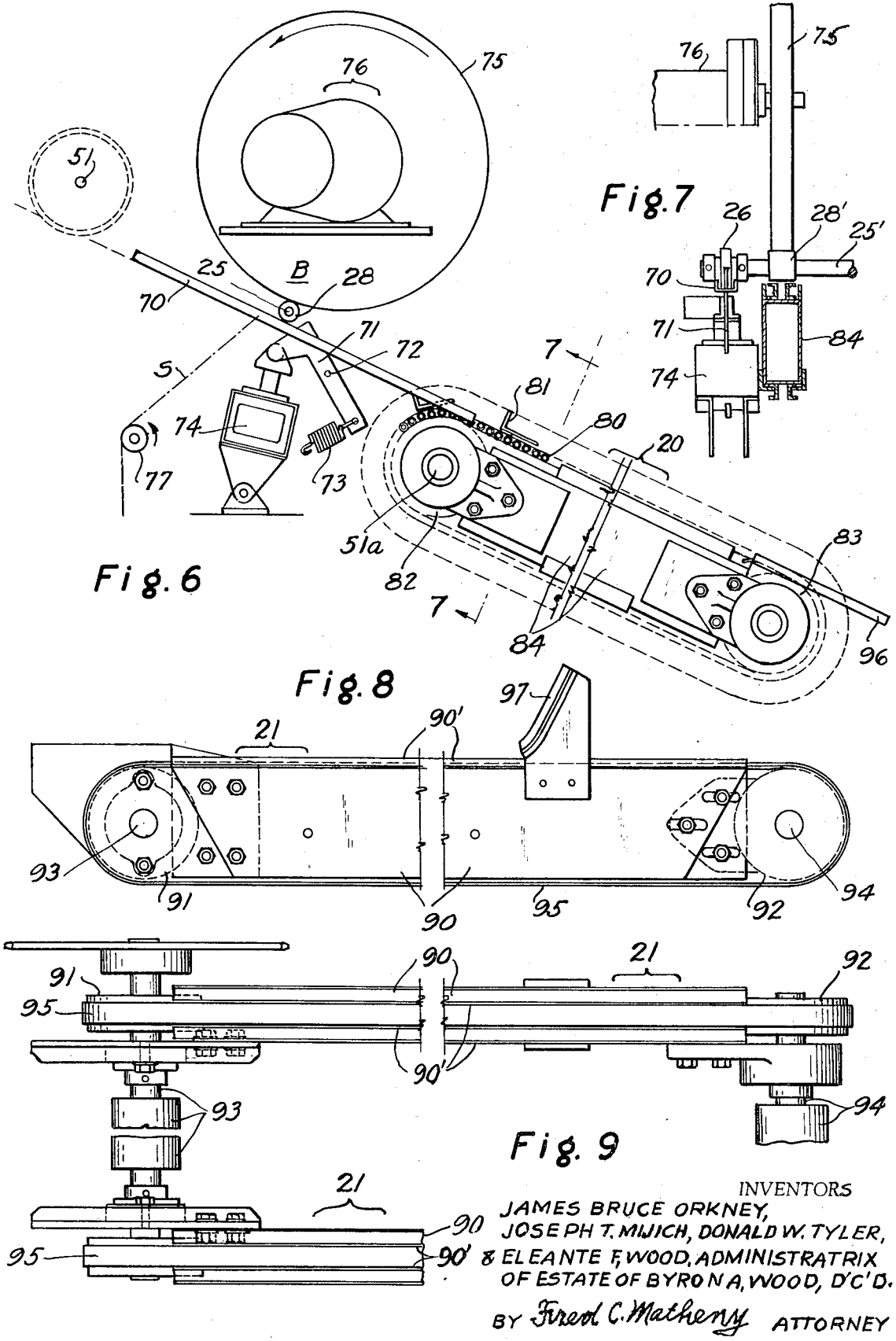

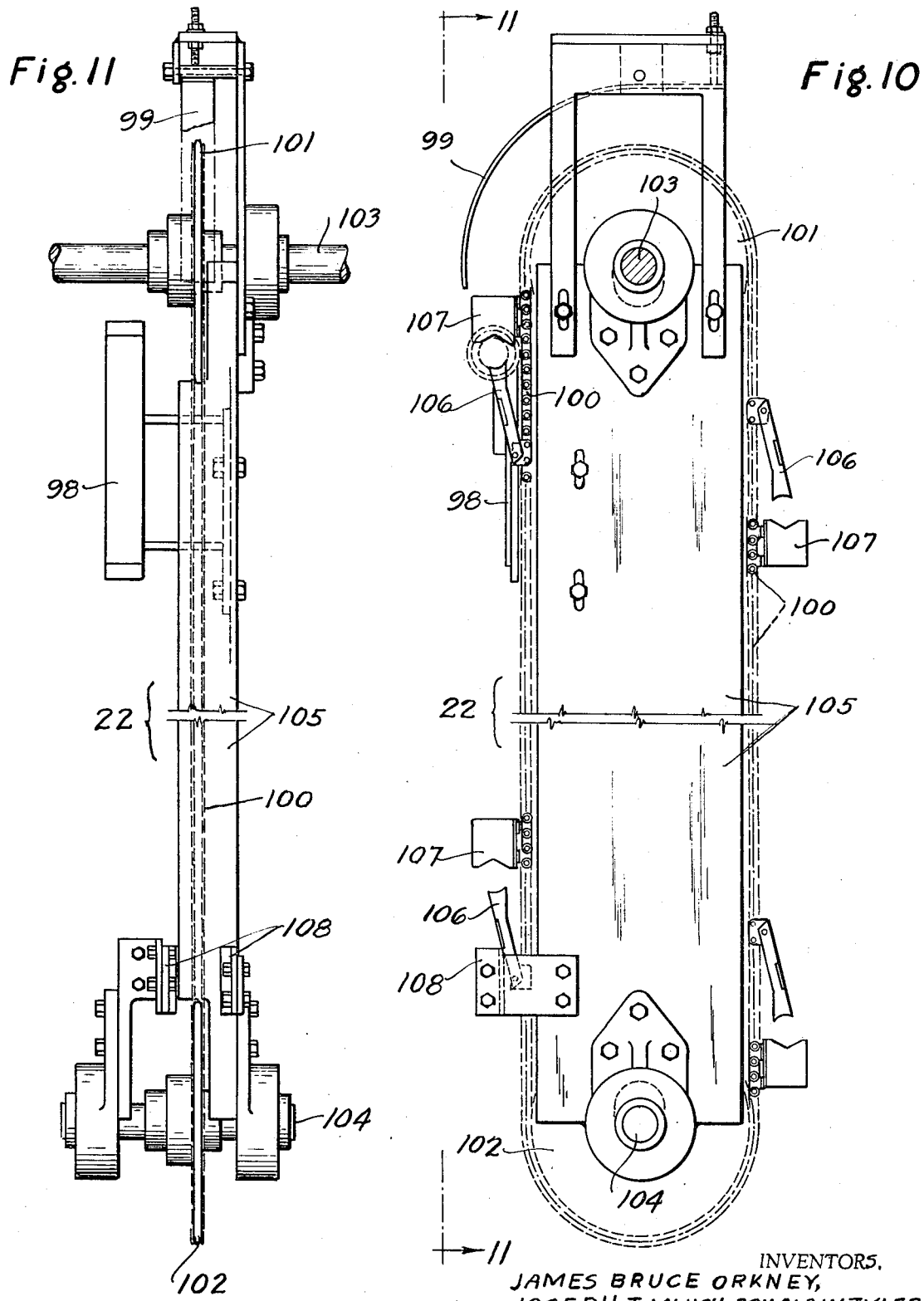

BY Fred C. Matheny   ATTORNEY

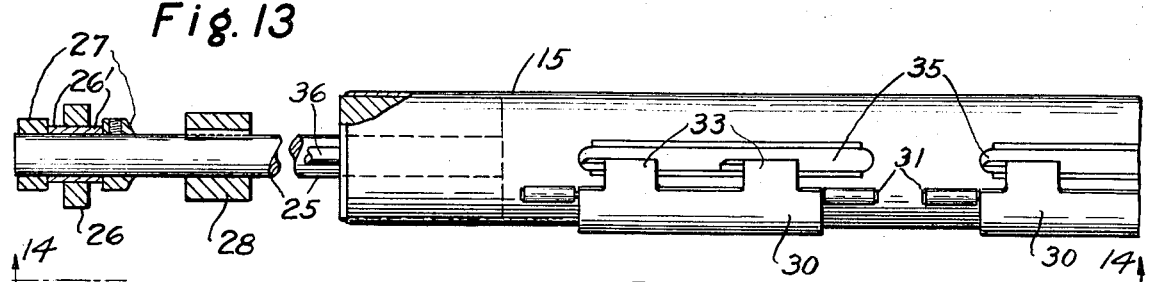
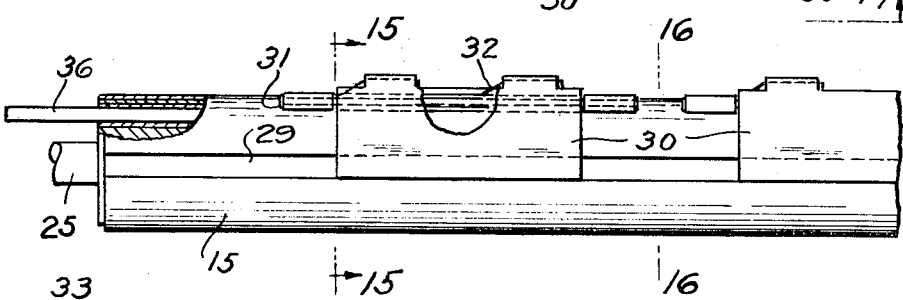
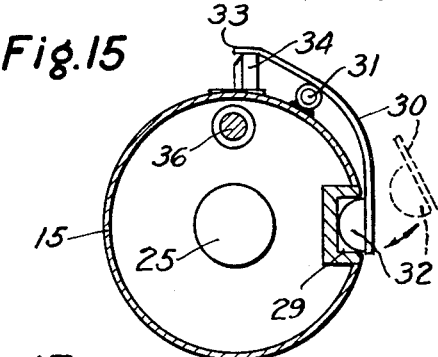
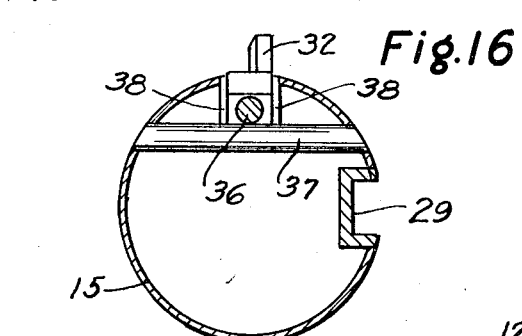
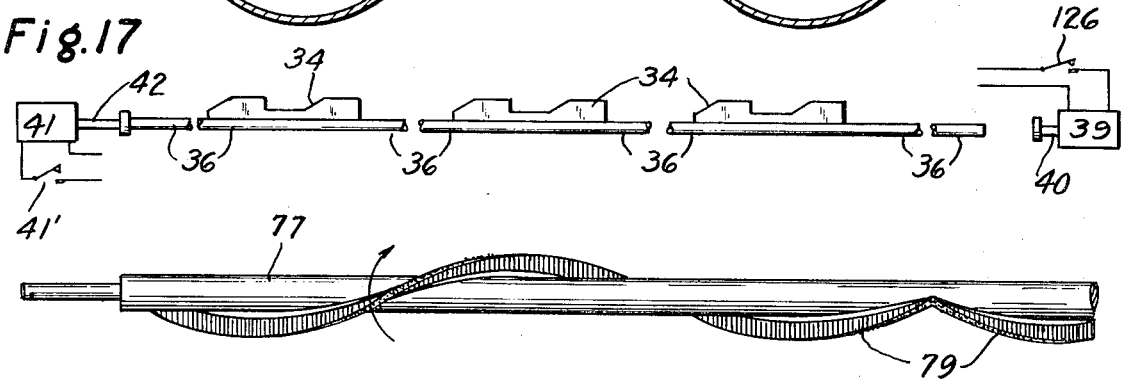

United States Patent Office 3,509,649
Patented May 5, 1970

3,509,649
METHOD OF AND APPARATUS FOR FEEDING SHEETS OF FLATWORK TO A FLATWORK IRONER
James Bruce Orkney, Bellevue, Wash. (822 Denny Bldg., 2200 6th Ave., Seattle, Wash. 98121), Joseph T. Mijich, 1625 IBM Bldg., Seattle, Wash. 98101, Donald W. Tyler, Seattle, Wash., and Byron A. Wood, deceased, late of Seattle, Wash., by Eleante F. Wood, administratrix, Seattle, Wash.; said Tyler and Wood assignors to said Orkney and Mijich
Filed Aug. 22, 1967, Ser. No. 662,552
Int. Cl. D06f 69/00
U.S. Cl. 38—7                                      14 Claims

ABSTRACT OF THE DISCLOSURE

A frame having sides of roughly triangular shape straddles the infeed means and forward end of the ironer. A large number of sheet storage rollers extend across the frame and are supported by the frame for movement in a generally triangular path. The edge of a sheet is clamped to each roller at the forward end of the frame. Each roller is then elevated with the sheet outspread, is rotated to wind the sheet on the roller and then, along with a large number of other rollers carrying sheets, it travels lengthwise over the ironer and back to an unwinding position where the sheet is delivered onto the infeed means of the ironer under the control of photo-electric cells which sense and are responsive to the position of the trailing edge of each sheet entering the ironer and control the delivery of the following sheet so as to avoid gaps between adjacent sheets and insure full capacity operation of the ironer.

BACKGROUND OF THE INVENTION

Field of the invention

Our invention relates generally to a method of and apparatus for feeding sheets of pliable material and particularly to a method of and apparatus for feeding flatwork to a flatwork ironer in a laundry.

Description of the prior art

In laundries it is common practice to feed flatwork, such as bed sheets, table cloths and the like, all of which are herein referred to simply as sheets, into a flatwork ironer by hand. This manual feeding of the flatwork direct to the ironer ordinarily requires a minimum of two operators and requires more than two operators if the ironer is to be operated near full capacity.

A primary object of our invention is to provide automatic sheet feeding apparatus which will make it possible for two operators to readily feed sheets to a flatwork ironer up to the full capacity of the ironer.

When two operators are feeding sheets directly to a flatwork ironer by hand they must stretch and smooth the sheets to a certain extent and must lay the leading edge of each sheet on the feed belts of the ironer, retaining hold of the leading edge of the sheet until they are sure it has advanced far enough so it will be engaged by the ironer rolls and moved on through the ironer. This takes time in the feeding of each sheet and is one reason why two operators cannot ordinarily feed a flatwork ironer to its full capacity.

SUMMARY OF THE INVENTION

It is an object of this invention to provide a sheet feeding apparatus which will help in straightening and smoothing the sheets and will relieve the operators from manually guiding the sheets into the ironer and which can be fed by two operators faster than the ironer can handle the sheets so that a reserve supply of sheets is maintained in the sheet feeder and if the operators stop work temporarily the sheet feeder can continue to supply sheets to the ironer at full capacity and the operators can build up the depleted reserve supply when they resume work. This makes it easier on the operators and at the same time enables them to turn out more work. The sheets are stretched and smoothed in the sheet feeder and the feeding of the sheets into the ironer is uniform and less dependent on the skill and dexterity of the operators than when they feed the sheets directly to the ironer.

Another object is to provide a method of and apparatus for feeding sheets to a flatwork ironer in which photo-electric cells or equivalent devices which sense and are responsive to the position of the trailing edge of each sheet going into the ironer control the infeed of the next sheet and insure full capacity operation of the ironer by preventing gaps between successive sheets.

Another object is to provide apparatus for feeding damp sheets of flatwork into a flatwork ironer in which the damp sheets are wound on rollers and in which a large number of the rollers with the sheets on them are caused to move in close formation through a substantial distance to a location above the infeed means of the ironer where the sheets are unwound from the rollers and fed into the ironer, the large number of rollers with the sheets on them providing a reserve supply of sheets which have been smoothed and straightened by spreading them and winding them on the rollers and are held in readiness to be fed into the ironer as fast as it will take care of them.

Another object is to provide sheet storage and feeding apparatus in which the sheets are held in reserve directly above and close to the ironer where they are subjected to the beneficial effect of the damp warm steam arising from the ironer.

Another object is to provide, in a sheet feeding device, adequate storage capacity for a large number of empty rollers.

BRIEF DESCRIPTION OF THE DRAWINGS

The characteristics of the invention will be apparent from the following description and accompanying drawings, wherein:

FIG. 1 is a view in side elevation, with parts omitted, of sheet feeding apparatus constructed in accordance with this invention.

FIG. 2 is a front end view in elevation of the same, parts being broken away.

FIG. 3 is a detached fragmentary view in side elevation, on a larger scale than FIGS. 1 and 2, showing one of the roller elevator and lift assemblies provided at the front end of the machine.

FIG. 4 is an elevational view looking in the direction of broken line 4—4 of FIG. 3.

FIG. 5 is an enlarged view partly in cross section and partly in plan taken substantially on broken line 5—5 of FIG. 3.

FIG. 6 is a fragmentary side elevational view showing devices for rotating rollers to wind sheets thereon and showing indexing conveyor means.

FIG. 7 is a view partly in cross section and partly in elevation taken on broken line 7—7 of FIG. 6.

FIG. 8 is a detached fragmentary side elevational view showing a crowding conveyor unit.

FIG. 9 is a fragmentary plan view of the crowding conveyor unit shown in FIG. 8 and parts of a similar unit at the other side of the machine.

FIG. 10 is a fragmentary side elevational view showing a lowering conveyor.

FIG. 11 is an edge view looking in the direction indicated by broken line 11—11 of FIG. 10.

FIG. 13 is a fragmentary plan view, with parts in section, showing a sheet carrying roller.

FIG. 14 is an elevational view looking in the direction indicated by broken line 14—14 of FIG. 13.

FIG. 15 is a view partly in section and partly in end elevation of said roller, taken substantially on line 15—15 of FIG. 14.

FIG. 16 is a sectional view of said roller taken on broken line 16—16 of FIG. 14.

FIG. 17 is a fragmentary detached elevational view of cams and a cam operating rod embodied in the roller shown in FIGS. 13 to 17, solenoids for longitudinally moving the rod being diagrammatically indicated by dotted lines.

FIG. 18 is a fragmentary plan view of an expander roll.

DESCRIPTION OF THE PREFERRED EMBODIMENTS

Figure 12:
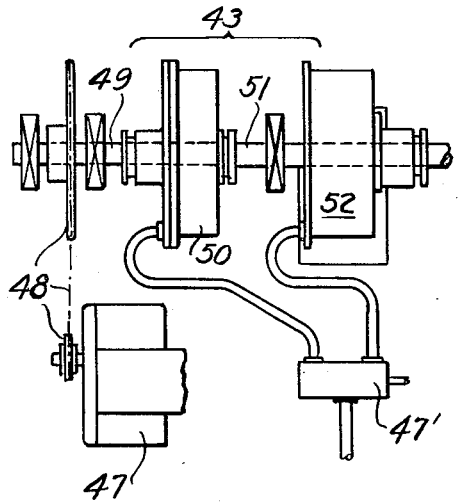
FIG. 12 is a somewhat diagrammatic plan view showing a typical driving assembly.

The frame structure of this apparatus comprises two similar upright side frames 7 and 8 supported in spaced apart parallel relation and connected with each other by suitable cross frame members 9. The side frame members 7 and 8 are spaced far enough apart so they can be positioned one on each side of a conventional flatwork ironer 10. The ironer 10 has infeed means, herein referred to as feed belts or ribbons 11, and has the usual heated platen 12 and rolls 13 between which the flatwork being ironed passes.

The frame formed by parts 7, 8 and 9 carries suitable devices, hereinafter described, for supporting and controlling the movement of a plurality of sheets carrying rollers 15 which are movable in a continuous path. This path of movement of the rollers 15 is generally triangular in shape as viewed from the side. In this description it will be assumed that the empty rollers start from the lower portion of an empty roller storage rack 16 where they are picked up by an elevator 17 and moved one at a time to a loading station A where a sheet is attached to each roller. The loading station A is positioned at a convenient working height above a floor 19 and at the herein termed forward end of the machine, this being the end shown at the left in FIG. 1.

From the loading station A, the rollers with sheets attached, are moved upwardly by a lift conveyor, indicated generally at 18, to a winding station B where the sheets are drawn over at least one expanding and smoothing roll 77 and a sheet is wound on each roller. The winding station B is located near the uppermost forward end of the machine. From the winding station B the rollers with the sheets wound on them are delivered to a driven indexing conveyor, indicated in a general way at 20, which extends at a downward incline toward the rear end of the machine. At the lower end of the indexing conveyor 20 the direction of travel of the rollers is reversed and they are transferred to an approximately horizontal crowding conveyor indicated generally at 21. The indexing conveyor 20 and crowding conveyor 21 provide storage space for a fairly large reserve supply of rollers carrying sheets ready to be fed into the ironer.

At the discharge end of the crowding conveyor 21 the rollers are delivered, one at a time, by a crowding action to a lowering conveyor, indicated generally by 22. Movement of the lowering conveyor 22 is controlled by photoelectric devices, which start said conveyor, and by a limit switch which stops said conveyor with a loaded roller at an unwinding station C. The lowering conveyor 22 carries the rollers past fixed friction plates causing the rollers to rotate and thus unwinds about two feet of the leading edge portion of each sheet as it is moving toward station C and this leading edge is laid down on the feed belts 11 of the ironer, preferably so that it slightly overlaps the trailing edge of the next preceding sheet. This leading edge portion is taken into the ironer and the unwinding of each sheet is completed by the pull of the ironer after the roller is stopped at the unwinding station C. As soon as the sheet is clear of the roller said roller moves onto zigzag tracks 23 of the empty roller storage rack 16 from which it is later picked up by the elevator 17.

The zigzag tracks 23, the elevators 17, the lifts 18, the indexing conveyors 20, the crowding conveyors 21 and the lowering conveyors 22 are all in duplicate at the respective sides of the machine and it will be understood that this description applies to these parts at either side.

The usual flatwork ironer has a maximum capacity of about twenty bed sheets of average size per minute and this sheet feeding device is preferably constructed so it can feed at least twenty sheets per minute to an ironer and can receive and wind the sheets on rollers at a faster rate, for instance about thirty sheets per minute. Also, preferably, the indexing conveyor 20 and the crowding conveyor 21 between winding station B and unwinding station C will store a maximum reserve in the order of fifty rollers with sheets wound on them, this being enough to keep the ironer operating at full capacity for more than two minutes if the operators should stop supplying sheets to the feeding device for that length of time.

Rollers 15 suitable for use with this sheet feeder are shown in FIGS. 13 to 17. Each roller 15 comprises a tube of light-weight, strong non-corrosive material, such as aluminum, about ten feet long with two rigidly attached duplicate axial shafts 25 protruding a substantial distance from its opposite ends. The outer end of each shaft 25 carries a rotatively mounted wheel 26 disposed between two adjustable set collars 27. Preferably wheel 26 is of durable material which will minimize noise. A fixedly attached wheel 28 is provided on each shaft 25 inwardly from the rotatably mounted wheel 26. Each roller 15 is longitudinally slotted and has a channel bar 29 secured within the slot with its trough side outermost to receive the edge of a sheet.

At least two spring clips 30 are attached to each roller 15 near the respective ends of the roller to receive and cooperate in holding the edge portion of a sheet. A third clip 30 may be used midway of the length of the roller. Each clip 30 is connected with its roller 15 by a pivot 31 positioned between the two ends of the clip. The sheet engaging end of each clip has a fixedly attached sheet gripping member 32 of rubber or like high friction material of suitable shape to cooperate with the channel 29 in holding a sheet. Two rearwardly extending end tabs 33 on each clip 30 have their end portions supported on cams 34. The cams 34 are longitudinally movable in slots 35 in the rollers 15 and are secured to a rod 36 by which they may be moved. The rod 36 extends lengthwise of the roller 15 and rests on cross pins 37, FIG. 16, and operates between guide plates 38. Each rod protrudes from both ends of its roller 15 and can be moved endwise to close the clamps 30 by a thrust plunger 40 of a solenoid 39 or to open said clamps 30 by the thrust plunger 42 of a solenoid 41. Solenoid 39 is at loading station A and solenoid 41 is preferably adjacent the delivery end of the crowding conveyor 22. Both solenoids 39 and 41 are diagrammatically shown in FIG. 17.

When each roller arrives at loading station A the clamps 30 will be in an open position, will be hanging by gravity below the roller with their sheet engaging ends forwardly directed and the closing of a limit switch 120, hereinafter described, will stop and hold the conveyors 17 and 18 while the operators insert the edge of a sheet between the clips 30 and the roller. Each operator will then close a switch 118 or 119, hereinafter described, and the closing of the last switch will energize solenoid 39, close clips 30 and start the cycle of conveyors 17 and 18 by energizing a motor 47 of a driving assembly indicated generally by 43 and which will now be described.

Driving assembly 43 is shown in plan in FIG. 12. It drives elevator 17 and lift conveyor 18. The indexing conveyor 20 and crowding conveyor 21 and lowering conveyor 22 are driven by similar driving assemblies indicated generally by 44, 45 and 46, FIG. 1. The following description of the driving assembly 43 will apply equally well to each of the others. Said driving assembly 43 comprises a motor 47 connected by a link belt 48 with a shaft 49. The shaft 49 extends into a clutch 50 by which it may be clutched to another shaft 51 which extends through a brake 52. Clutch 50 and brake 52 are both pneumatically operated and both are controlled by a solenoid valve 47'. The clutch 50 and brake 52 are of well-known conventional construction and are not herein described in detail. The solenoid of the valve 47' of driving assembly 43 is diagrammatically indicated by 122 in FIG. 20 and is hereinafter referred to. When this solenoid 122 is energized it applies the clutch 50 and releases the brake 52 and when it is de-energized it releases the clutch 50 and applies the brake 52. This provides instant starting and stopping and positive holding of the conveyors by the driving assembly 43 and the other similar driving assemblies.

The empty roller elevator 17 and lift conveyor 18 are interconnected for simultaneous operation and the shaft 51 of driving assembly 43 extends across the uppermost front end of the machine at the upper end of a generally upright frame member 57 of lift conveyor 18 and carries the uppermost sprocket wheel 53 of each lift conveyor unit. An endless conveyor chain 54 is carried on each sprocket wheel 53 and passes around a sprocket wheel 55 at the lower end of the upright frame member 57. Flights 56 are provided at suitably spaced intervals on chains 54 and are spaced and positioned so they will engage with the fixed wheels 28 on the shafts of rollers 15 and lift the rollers. As the rollers are moved upwardly by the chains 54 the rotatable wheels 26 on the roller shafts 25 run in channel shaped tracks 57a. These tracks 57a are supported from the upright frame members by brackets 57b and they hold the rollers 15 in engagement with the flights 56 of lift chains 54 during their upward movement.

Each empty roller elevator unit 17 comprises a generally upright frame member 58 supporting two spaced apart sprocket wheels 59 and 60 which carry an endless conveyor chain 61 having spaced apart flights 62. The flights 62 are suitably shaped and positioned so that, in their upward movement, they will engage with the wheels 26 of rollers 15 and elevate the rollers 15 to the loading station A where contact will be made with limit switch 120, hereinafter described, in circuits which control the operation of the driving assembly 43 and the conveyors 17 and 18 will be stopped and held immovable while two operators are attaching a sheet to the roller.

The sprocket wheels 59 at the upper ends of empty roller elevator units 17 are mounted on bearings 63 and said sprocket wheels have a driving connection through other sprocket wheels 64, 65, 66, and 67 and link belts 68 and 69 with the shaft 51 of driving assembly 43. This synchronizes conveyor chains 54 and 61 so that each cycle of operation of said chains will move an empty roller to the loading station A and a roller which has a sheet attached from the loading station A to the upper end of the lift conveyor 18 where it is released and moves by gravity along a track 70 to winding station B. Suitable tighteners 68a and 69a are provided for the respective chains 68 and 69 which drive conveyor chains 54 and 61.

When they are released by the lift conveyor 18 the rollers with sheets attached move downwardly along the inclined trackways 70 until they are stopped by stop members 71, FIGS. 6 and 7. The stop members 71 are fulcrumed on pivots 72, are normally held in roller stopping positions by springs 73 and can be retracted by solenoids 74 to release the rollers. When rotatively mounted wheels 26 are against stop members 71, the fixedly attached wheels 28 on shafts 25 are in frictional driving contact with the periphery of a relatively large wheel 75 which is driven by a motor 76.

The arrival of a roller 15 at station B operates a limit switch 123, as more fully hereinafter explained in connection with FIG. 20, and energizes a time delay relay 124, which in turn energizes the motor 76. Time delay relay 124 allows motor 76 sufficient time to wind a sheet on the roller 15 and then breaks the circuit to said motor 76 and closes the circuit to solenoid 74 which retracts stop member 71 and lets the roller move by gravity along track 70 to the indexing conveyor 20. As the roller leaves winding station B the limit switch 123 opens and this resets time delay relay 124 and breaks the circuit to solenoid 74 setting stop 71 for the next roller.

As the sheet is wound on a roller at station B it is drawn over a smoothing and expander roll 77, FIGS. 2, 6 and 18, which is constantly driven by a motor 78 in the direction indicated by the arrows. Expander roll 77 carries at least one row of bristles 79 which spiral in opposite directions from a point midway of its length toward its respective ends. These bristles stretch and smooth the sheet both longitudinally and transversely as it is being wound on the roller 15 and leave it in better condition for passage through the ironer. After each roller leaves winding station B the wheels 28 move onto flights 81 of conveyor chains 80 of the indexing conveyor 20. The chains 80 are carried on upper sprocket wheels 82 and lower sprocket wheels 83 and move along frame bars 84. The upper sprocket wheels 82 of the two indexing conveyor units at opposite sides of the machine are secured on a common cross shaft 51a of driving assembly 44, which shaft 51a extends entirely across the machine and synchronizes the two chains 80 at opposite sides.

From the indexing conveyor 20 the rollers 15 are delivered to the crowding conveyor 21 and their direction of travel is reversed. The crowding conveyor unit at each side of the machine comprises a horizontal frame or track bar 90 having two belt pulleys 91 and 92 mounted on shafts 93 and 94 respectively at opposite ends thereof. An endless belt 95 of flat pliable material is carried on each pair of belt pulleys 91 and 92 and runs on track bar 90 between two spaced apart guide members 90'. The shaft 93 extends across the machine and is driven by driving assembly 45. The freely rotatable wheels 26 of the rollers 15 rest on the top laps of the moving belts 95 and said belts keep all the loaded rollers thereon crowded together with the foremost roller pressed against the lowering conveyor 22. Two guide members 97 and 96 at the roller receiving end of each crowding conveyor unit 21 guide the loaded rollers in their descent from the indexing conveyor onto the crowding conveyor.

The lowering conveyor 22 comprises sprocket chains 100 which are carried on sprocket wheels 101 and 102. Wheels 101 and 102 are mounted on shaft 103 and 104 respectively at the ends of a generally upright frame member 105. The uppermost shaft 103 is intermittently driven by the driving assembly 46 and extends across the machine and synchronizes movement of the conveyor chains 100 at the two sides.

The chains 100 are provided at spaced intervals with sets or pairs of retainers 106 and flights 107. The flights 107 are in the same plane as the chains 100 and are adapted to engage with the wheels 26 of the rollers as they move upwardly past the end of the crowding conveyor 21. The retainers 106 are attached to the sides of the chains 100 and are positioned so that they will engage with the hubs 26', FIG. 13, of the wheels 26. As the retainers 106 pass the hubs 26' they are first moved toward the chains 100 and then swing outwardly into a hub engaging position in front of the hubs 26'. They thus cooperate with the flights 107 to firmly hold the rollers while they are being moved around the upper sprocket wheels and under a curved guide and brake member 99 and downwardly along the outer side of the lowering conveyor to the sheet unwinding station C. Shortly after the rollers 15 pass around the upper sprockets 101 and start to move downwardly the fixed wheels 28 thereof make contact with friction plates 98 which rotate the rollers 15 in an unwinding direction a sufficient number of turns to unwind a two to three foot length of the leading edge portion of the sheet S, as diagrammatically shown in FIG. 21.

Movement of the conveyor chains 100 is controlled by a limit switch 129 which stops and holds said chains whenever there is a roller 15 at unwinding station C and by photo-electric cells 130 which prevent movement of said chains 100 whenever the beam between them is interrupted by a sheet S being moved into the ironer. Operation of limit switch 129 by the arrival of a loaded roller 15 at station C actuates the solenoid controlled pneumatic valve 50' and releases the clutch 50 and sets the brake 52 of driving assembly 46. This stops and holds conveyor chains 100 while the unwinding of the sheet from the roller is being completed by the pull of the ironer. Before each loaded roller 15 arrives at the unwinding station C and preferably while the roller is still on the crowding conveyor 21 it closes a switch 41' which momentarily energizes the solenoid 41, FIG. 17. This moves the rod 36 to the right and releases the clamps 30 which grip the edges of the sheet.

The empty roller at station C is released at the start of the next cycle of movement of the lowering conveyor 22 by engagement of the retainers 106 with fixed cams 108 which are supported from the frame bars 105. The released empty roller will be deflected by and will roll down a curved track 109 into the storage rack 16. Each cycle of movement of the conveyor chains 100 is started when the trailing edge of a just unwound sheet moves clear of the beam between the cells 130. When this occurs and the next loaded roller 15 is moved downwardly the leading edge of the sheet hanging therefrom will be lowered onto the moving feed belts 11 of the ironer, preferably so that it slightly overlaps the trailing edge of the preceding sheet. It will be noted, FIG. 21, that the roller and the leading edge of the sheet being lowered onto the infeed belts 11 of the ironer 10 will intercept the beam between cells 130 before the roller reaches station C but the chains 100 will continue to move until the next operation of limit switch 129 at station C.

Figure 19:
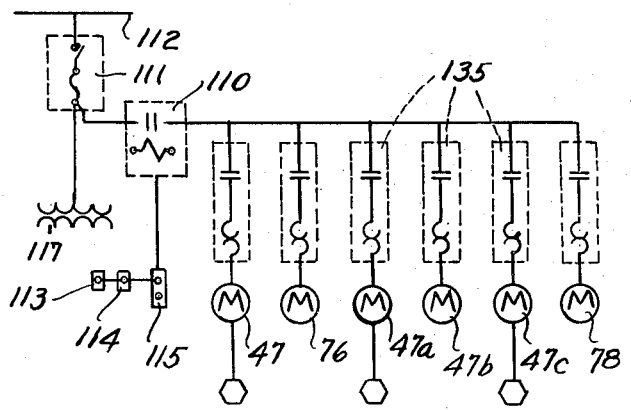
FIG. 19 is a single line power diagram showing motors and circuits connected therewith.
Figure 20:
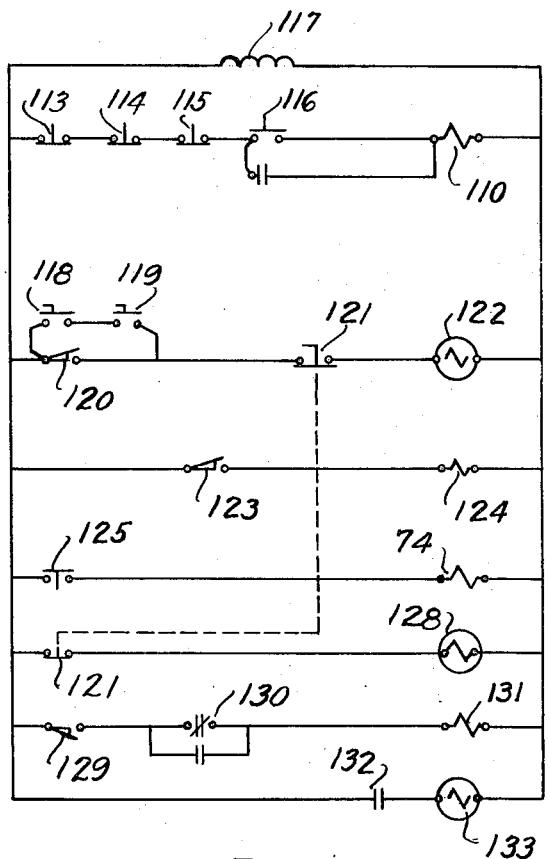
FIG. 20 is a wiring diagram illustrating electrical control and operating devices for the machine.

FIGS. 19 and 20 are single line power diagrams showing electrical devices and connections. FIG. 19 shows the previously mentioned motors 47, 47a, 47b and 47c of the conveyor driving units and the motors 76 and 78 all connected through a master contactor switch 110 and a main disconnecting switch 111 with a four hundred forty volt sixty cycle power line 112. Opening of the main switch 111 will disconnect all power to both the ironer and the sheet feeder. Opening of the master switch or contactor 110 will disconnect all driving motors of the sheet feeder. Three push button type remote control switches 113, 114 and 115 are connected with the master contactor 110 for emergency stopping of the sheet feeder. Switches 113 and 114 are suitably positioned for control by the two operators who supply sheets to the feeder. Switch 115 may be at any suitable station for starting and stopping the machine. 135 indicates a motor starter in the form of an isolation switch and thermal overload protector in the circuit of each motor.

FIG. 20 shows the master contactor 110 and switches 113, 114 and 115 and a system start switch 116 in circuits of the sheet feeder which are energized by one hundred twenty volt sixty cycle current from a transformer 117. In said FIG. 20, 118 and 119 are two foot switches used by the two operators who attach the sheets to the rollers 15. 120 is the limit switch at loading station A. 122 is the solenoid of pneumatic valve 47' of driving assembly 43. A momentary contactor 126 to bring about the momentary closing of a circuit to the solenoid 39 by which the sheet holding clamps 30 are closed at the loading station A is provided in connection with the two foot switches 118 and 119 so it will be operated by the closing of both of these switches 118 and 119 but will not be operated by limit switch 120. Momentary contactor 126 is diagrammatically shown in FIG. 17.

123 is a limit switch positioned so it will be operated by the arrival of a roller 15 at the winding station B and will close a circuit to a time delay relay 124. After allowing time for the winding of a sheet on a roller the time delay 124 will close a switch 125 and hold closed a circuit to the stop solenoid 74 long enough to cause said solenoid 74 to retract stop member 71 and release the roller. Release of limit switch 123 when the roller leaves winding station B resets the relay 124.

121 is a time delay limit switch in the circuits of solenoids 122 and 128 of pneumatic valves 47' of the two driving assemblies 43 and 44, it being noted that assembly 43 drives conveyors 17 and 18 and assembly 44 drives conveyor 20. Switch 121 is positioned at the roller receiving end of the crowding conveyor 21. Its function is to open the driving circuits of conveyors 17, 18 and 20 if the crowding conveyor 21 is loaded to capacity. The time delay feature in switch 121 permits the rollers to pass over it without stopping conveyors 17, 18 and 20 as long as the rollers continue to move but to stop said conveyors in the event the rollers stop moving and remain in engagement with said switch.

129 is a limit switch positioned to be operated by the arrival of a roller at the unwinding station C to open a circuit to a solenoid 131 of the pneumatic valve 47' of the lowering conveyor driving assembly 46 to stop and hold the lowering conveyor during the unwinding of a sheet.

Figure 21:
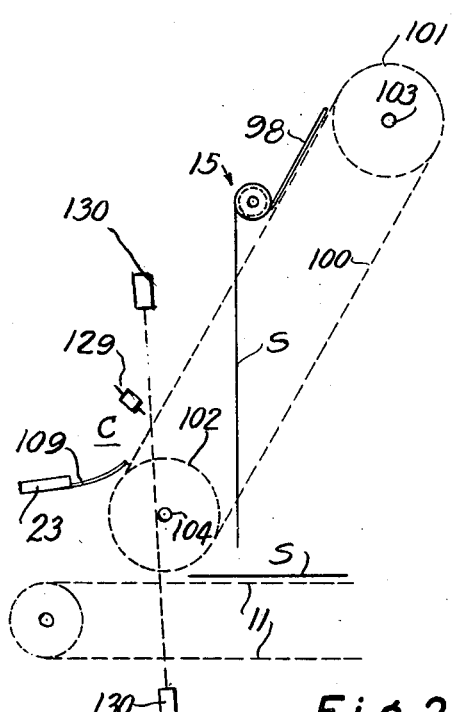
FIG. 21 is a diagram illustrative of photo-electric control devices.

130 is the photo-electric cell assembly, also illustrated in FIG. 21, which senses when a sheet is free of the roll at unwinding station C and starts the next cycle of operation of the lowering conveyor 22.

The operation of this sheet feeder may be summarized as follows: The rollers are moved in a continuous path. In most instances the wheels 26 operate in channel shaped tracks or are positively held by devices on the conveyor chains so as to prevent disalignment and endwise movement of the rollers. Elevating conveyor 17 receives the empty rollers from storage rack 16, elevates them to loading station A and holds them while the operators attach a sheet. The closing of two switches by the operators starts the cycle of conveyors 17 and 18 which lifts the roller with sheet attached to winding station B and elevates another empty roller to loading station A. When the roller, with sheet attached, reaches winding station B it operates a switch which starts rotation of the roller, causing the sheet to the drawn over the constantly driven smoothing roll 77 and wound onto the roller, and then releasing the roller so that it moves onto the indexing conveyor 20. Said indexing conveyor can and normally does operate continuously and synchronously with the conveyors 17 and 18 and will ordinarily be filled with loaded rollers during normal operation of the machine. However, independent circuit means controlled by the operators is preferably provided in connection with the indexing conveyor driving assembly 44 so they can operate the indexing conveyor at will to deliver rollers therefrom to the crowding conveyor 21 when the conveyors 17 and 18 are not operating.

The indexing conveyor 20 and crowding conveyor 21 provide storage space for a large number of loaded rollers. If the crowding conveyor becomes fully loaded the limit switch 121 will be operated and conveyors 17, 18 and 20 stopped. The lowering conveyor 22 receives the loaded rollers from the crowding conveyor, unwinds a predetermined length of the leading edge of each sheet and lowers the rollers to the unwinding station C so as to lay the unwound leading edge portion of the sheet down on the feed belts of the ironer. The photo-electric cells 130 control the cycling of the lowering conveyor 22 in such a manner as to prevent gaps and lost space between successive sheets in the ironer.

We claim:

1. The method of feeding sheets of flatwork to a flatwork ironer which has infeed means, comprising individually winding each sheet on a separate roller; maintaining a reserve supply of rollers with sheets wound on them adjacent to the ironer; and transferring the sheets to the ironer by unwinding at least a portion of each sheet from its roller and lowering the leading edge portion of the sheet onto the infeed means of the ironer.

2. The method as claimed in claim 1 in which the step of maintaining a reserve supply includes supporting said rollers close to and substantially directly above the ironer.

3. The method as claimed in claim 1 wherein said transferring step includes lowering the leading edge portion of the sheet by lowering the roller.

4. The method as claimed in claim 1 wherein said transferring step includes positioning the leading edge of each sheet being lowered onto the infeed means of the ironer by photo-electrically sensing the position of the trailing edge of the next preceding sheet going into the ironer.

5. In apparatus for feeding sheets of flatwork into an ironer infeed means which draws the flatwork into the ironer, the combination comprising: means positioned above said infeed means for supporting the sheets and lowering edge portions of the sheets one after another onto the infeed means of the ironer whereby the sheets are drawn into the ironer; said supporting and lowering means including a plurality of sheet supporting rollers having sheets wound thereon and a conveyor for sequentially lowering said rollers one after the other, said conveyor including means for rotating each of said rollers to lower said edge portions of the sheets by unwinding them from said rollers; and sensing means responsive to the position of the trailing edge of each sheet going into the ironer and controlling the conveyor and thus the delivery of the next succeeding sheet onto the infeed means of the ironer.

6. In apparatus for feeding sheets of flatwork into an ironer infeed means which draws the flatware into the ironer, the combination comprising: roller supporting frames having parts positioned adjacent to and above the level of said infeed means; a plurality of rollers supported by said frames for movement into positions over and above said infeed means, each roller having sheet gripping means capable of engaging with and releasably holding an edge of a sheet; a first roller rotating means operable in rotating said rollers and winding sheets thereon; a second roller rotating means spaced from said first roller rotating means operable in rotating said rollers and unwinding at least a portion of a sheet therefrom, said second roller rotating means being positioned above and adjacent to said infeed means whereby the leading edge portions of sheets unwound by said second roller rotating means are lowered onto said infeed means.

7. The apparatus as claimed in claim 6 in which sensing means responsive to the position of the trailing edge of each sheet going into the ironer controls the powering of the next succeeding sheet and predetermines the position of the leading edge of said next succeeding sheet on the infeed means of the ironer.

8. The apparatus as claimed in claim 6 in which the two roller supporting frames are parallel and of generally triangular outline and are positioned close to but outwardly from the respective sides of the ironer and in which each roller supporting frame comprises an end part and two side parts, the end part being positioned forwardly of the infeed means of the ironer and extending in a generally upward direction and the side parts extending away from the end part and longitudinally of the ironer and supporting the rollers with the sheets on them above the level of the ironer; and roller lift means operable in moving the rollers upwardly along the upwardly extending end parts of the roller supporting frames.

9. Apparatus for feeding sheets of flatwork to a flatwork ironer which has infeed means comprising two driven parallel spaced apart generally upright roller lift assemblies; two parallel upper roller conveyor and track assemblies extending outwardly from the upper ends of the respective roller lift assemblies; two lower roller conveyor and track assemblies extending from the outer ends of the respective upper conveyor and track assemblies back to the lower end portions of the respective roller lift assemblies; a plurality of sheet carrying rollers each having sheet clamping means and each adapted to have a sheet wound thereon, said rollers extending crosswise of and being supported by said roller lift assemblies and said upper and lower conveyor and track assemblies for movement in a continuous path; roller rotating means positioned adjacent the upper end of said roller lift assemblies operable in winding sheets on said rollers; and sheet unwinding and delivery means provided in said lower roller conveyor and track assembly operable in feeding the sheets onto said ironer infeed means when it is positioned substantially over said ironer infeed means.

10. The apparatus as claimed in claim 9 in which each roller lift assembly includes two intersecting conveyors intermittently driven at two different speeds and providing at the location where they intersect a roller transfer and loading station.

11. The apparatus as claimed in claim 9 in which a zigzag empty roller storage track portion is provided in each lower conveyor and track assembly between said sheet unwinding and delivery means and the lower end portion of said roller lift assembly.

12. The apparatus as claimed in claim 9 in which the sheet unwinding and delivery means in each lower conveyor and track assembly includes a roller lowering conveyor.

13. The apparatus as claimed in claim 9 in which the portion of each lower roller conveyor and track assembly between the sheet unwinding and delivery means and the upper roller conveyor and track assembly is a driven crowding conveyor.

14. The apparatus as claimed in claim 9 in which an intermittently driven indexing conveyor form a major portion of each upper roller and track assembly.

References Cited

UNITED STATES PATENTS

| 1,684,451 | 9/1928 | Lowe | 38—8 |
|---|---|---|---|
| 2,060,511 | 10/1936 | Learnard et al. | 271—63 |
| 2,210,447 | 8/1940 | Couch | 38—2 |
| 2,740,457 | 4/1956 | Wood et al. | |
| 2,767,492 | 10/1956 | Broad | 38—7 |
| 3,198,315 | 8/1965 | Long | 38—143 X |
| 3,231,267 | 1/1966 | Boam et al. | 271—69 |
| 2,829,451 | 4/1958 | Hajos | 38—8 |

MERVIN STEIN, Primary Examiner

G. V. LARKIN, Assistant Examiner

U.S. Cl. X.R.

271—69, 76